(12) United States Patent
Vidal et al.

(10) Patent No.: US 12,056,160 B2
(45) Date of Patent: Aug. 6, 2024

(54) CONTEXTUALIZING DATA TO AUGMENT PROCESSES USING SEMANTIC TECHNOLOGIES AND ARTIFICIAL INTELLIGENCE

(71) Applicant: SAP SE, Walldorf (DE)

(72) Inventors: Gilad Vidal, Ganey Tikva (IL); Marcus Krug, Berlin (DE)

(73) Assignee: SAP SE, Walldorf (DE)

( * ) Notice: Subject to any disclaimer, the term of this patent is extended or adjusted under 35 U.S.C. 154(b) by 59 days.

(21) Appl. No.: 18/083,024

(22) Filed: Dec. 16, 2022

(65) Prior Publication Data
US 2024/0202212 A1    Jun. 20, 2024

(51) Int. Cl.
*G06F 16/28* (2019.01)
*G06F 16/2455* (2019.01)
*G06N 5/022* (2023.01)

(52) U.S. Cl.
CPC ........ *G06F 16/283* (2019.01); *G06F 16/2455* (2019.01); *G06N 5/022* (2013.01)

(58) Field of Classification Search
CPC .... G06F 16/283; G06F 16/2455; G06N 5/022
USPC ........................................................ 707/600
See application file for complete search history.

(56) References Cited

U.S. PATENT DOCUMENTS

| | | | |
|---|---|---|---|
| 8,577,911 B1 * | 11/2013 | Stepinski | G06F 16/3325 707/765 |
| 10,824,473 B1 | 11/2020 | Krug et al. | |
| 10,963,800 B2 * | 3/2021 | Cuddihy | G06N 5/02 |
| 2017/0249388 A1 * | 8/2017 | Alonso | G06F 16/9535 |
| 2019/0222542 A1 * | 7/2019 | Snider | H04L 51/04 |
| 2019/0258722 A1 * | 8/2019 | Guo | G06F 16/9024 |
| 2020/0334715 A1 * | 10/2020 | Shi-Nash | G06N 5/04 |
| 2020/0356553 A1 * | 11/2020 | Moss | G06F 16/2246 |
| 2021/0192372 A1 * | 6/2021 | Kang | G06F 16/2282 |
| 2022/0188943 A1 | 6/2022 | Krug et al. | |

OTHER PUBLICATIONS

Shen, Xinyao, et al., "Diversified Query Generation Guided by Knowledge Graph", WSDM '22, Virtual Event, Tempe, AZ, Feb. 21-25, 2022, pp. 897-907.*

(Continued)

*Primary Examiner* — Robert Stevens
(74) *Attorney, Agent, or Firm* — Fish & Richardson P.C.

(57) ABSTRACT

The present disclosure involves systems, software, and computer implemented methods for contextualizing data to augment processes using semantic technologies and artificial intelligence. One example method includes identifying one or more data sources for semantic analysis. The data sources can include a data warehouse, a database, or a data lake. User behaviors of one or more users are identified for semantic analysis. The user behaviors include behaviors of how the users consume data in the one or more data sources. A semantic model is generated, using a knowledge graph, for the user behaviors. Nodes of the knowledge graph correspond to a class of entities in the data sources and are annotated with user behaviors and data source information. One or more queries from a user are monitored. Data from at least one node of the knowledge graph is recommended to the user, based on the semantic model and the queries.

20 Claims, 5 Drawing Sheets

(56) References Cited

OTHER PUBLICATIONS

Qiu, Yunqi, et al., "Hierarchical Query Graph Generation for Complex Question Answering over Knowledge Graph", CIKM '20, Virtual, Event, Ireland, Oct. 19-23, 2020, pp. 1285-1294.*

Alonso, Omar, et al., "Graph Search and Beyond—SIGIR 2015 Workshop Summary", SIGIR '15, Santiago, Chile, Aug. 9-13, 2015, pp. 1145-1146.*

Wikipedia.org [online], "Artificial intelligence" created on Oct. 2004, retrieved on Dec. 16, 2022, retrieved from URL <https://en.wikipedia.org/wiki/Artificial_intelligence>, 62 pages.

Wikipedia.org [online], "Knowledge graph" retrieved on Dec. 16, 2022, retrieved from URL <https://en.wikipedia.org/wiki/Knowledge_graph>, 5 pages.

Wikipedia.org [online], "Natural language processing" retrieved on Dec. 16, 2022, retrieved from URL <https://en.wikipedia.org/wiki/Natural_language_processing>, 13 pages.

* cited by examiner

Table - Machines 202

| Id 204 | Model 206 | Desc 208 |
|---|---|---|
| 101 | Lathe800 | CNC |
| 102 | Lathe802 | Speed lathe |

Tables Machines_locations 210

| Id 212 | Start_Date 214 | Location 216 |
|---|---|---|
| 101 | 1/1/2020 | Floor A |
| 102 | 1/2/2021 | Floor B |

218

Email: found fault in lathe model 800, should have maintenance type 2 after 3 months and not 6.

200

CONTEXTUALIZING DATA TO AUGMENT PROCESSES USING SEMANTIC TECHNOLOGIES AND ARTIFICIAL INTELLIGENCE

TECHNICAL FIELD

The present disclosure relates to computer-implemented methods, software, and systems for contextualizing data to augment processes using semantic technologies and artificial intelligence.

BACKGROUND

Data processing systems can include, for example, Online Analytical Processing (OLAP) systems and Online Transactional Processing (OLTP) systems. OLAP can be used to analyze different data sets to uncover data insights. OLTP systems are transactional systems for handling transactions in turn.

SUMMARY

The present disclosure involves systems, software, and computer implemented methods for contextualizing data to augment processes using semantic technologies and artificial intelligence. An example method includes: identifying one or more data sources for semantic analysis, wherein the one or more data sources comprise at least one of a data warehouse, a database, or a data lake; identifying one or more user behaviors of one or more users for semantic analysis, wherein the one or more user behaviors comprise behaviors of how the one or more users consume data in the one or more data sources; generating, using a knowledge graph, a semantic model for the one or more user behaviors, wherein nodes of the knowledge graph correspond to a class of entities in the one or more data sources and are annotated with user behaviors and data source information; monitoring one or more queries from a user; and recommending, based on the semantic model and the one or more queries from the user, data from at least one node of the knowledge graph to the user.

Implementations may include one or more of the following features. User behaviors can include a user report request, a user query, or logged information indicating user activity with one or more processes. A user behavior using a data source can be a user context. Relevance scores can be computed for data sources for user contexts. A respective relevance score for a data source for a respective user context can indicate a strength of match of the data source to the user context. Recommending data from at least one knowledge graph node to the user can include identifying one or more nodes that are associated with data sources have highest relevance scores to a user context that matches the one or more queries of the user. Data sources with highest relevance scores can be added to a data catalog. A search request can be received from a user for data in the data catalog that matches a user context. Catalog entries can be identified in the data catalog that match the user context. The identified catalog entries that match the user context of the search request can be provided, in response to the search request. The one or more data sources can include structured and unstructured data. The semantic model can be developed using one or more of natural language processing and machine learning. A determination can be made as to whether the user interacted with recommended data. The semantic model can be updated based on whether the user interacted with recommended data. A new data source can be identified. Semantic analysis can be performed on the new data source and the semantic model can be updated based on the semantic analysis of the new data source including adding or updating nodes in the knowledge graph to include data from the new data source. Relevance scores for added and updated nodes for user contexts can be included in the semantic model. Knowledge graph data that includes data from the new data source can be recommended as a match to a user context of a new user query. Recommending data from at least one node of the knowledge graph to the user can include recommending, to the user, a data source associated with a first node.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
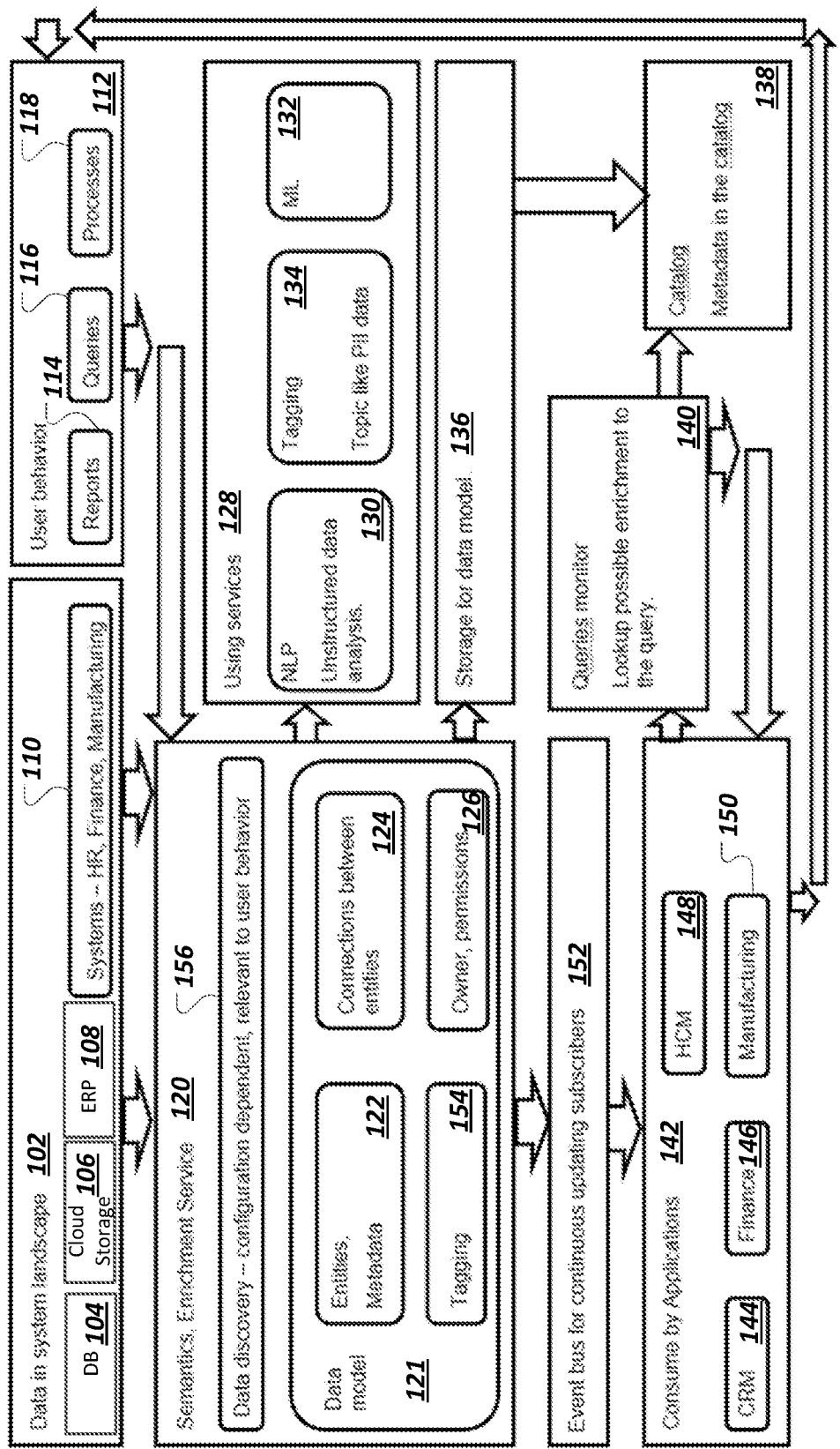
FIG. 1 is a block diagram illustrating an example system for contextualizing data to augment processes using semantic technologies and artificial intelligence.

Customers of enterprise software have an increasing amount of data that can be stored, for example, in low-cost storage, databases, or other storage technologies. Data, which can be structured or unstructured data, can come from customer or third-party data sources, sensors, user experience data, or data systems in the customer landscape, such as financial, HR (Human Resource), manufacturing, web logs, etc. Such data can enrich the productivity of an individual system and, for example, also enrich reports that a customer produces with various tools. But even if customers have access to data, the customer may not be aware of important aspects of the data, such as which semantic entities certain data refers to, how the data gets updated, and a quality level or context of the data, among other details. Accordingly, serving data to enterprise users in a relevant context can be challenging.

As an example, integration of data into existing system landscape and process flows can involve manual processes that often require deep understanding of desired use cases for the data. Based on an understanding of data use cases, IT (Information Technology) professionals can manually set up system connectors and import data, and information architects can become involved and manually model and structure access to the data. For example, customers can create data catalogs which describe data in a system, such as type of data, source of data, data lineage, etc. Catalog data can then be manually mapped to user roles or processes.

As another example, to leverage new data sources in an organization, data often needs to be pre-processed and annotated semantically to make the data useful, which can involve substantial manual human effort and expenditure of resources. Additionally, even if data is pre-processed and annotated, enterprise customers might not know how to become aware that data that might be relevant for them exists. Furthermore, existing processes for accessing relevant data can be cumbersome and complicated, unless prior efforts have been made to deeply integrate data into existing corresponding workflows. For many workflows, however, such prior efforts may have not been performed. As a result of the issues, problems, and challenges discussed above, data is often not leveraged to its full potential in an enterprise, especially for unforeseen or long-tail use cases or use cases for which the data has not been previously prepared.

To solve these and other problems, a holistic contextualization approach can be used to integrate and contextualize new and existing datasets to enable wide accessibility of the datasets throughout the organization and for a wide variety of use cases, in a fully automatic way leveraging semantic technologies and AI (Artificial Intelligence). With the contextualization approach, a system landscape (e.g., ERP (Enterprise Resource Systems), data warehouses, databases, data lakes) of an organization can be analyzed along with user behavior information to develop and train a semantic model that reflects interests of the organization and individual organizational users.

New data sources can be automatically analyzed and annotated using ML (Machine Learning, NLP (Natural Language Processing), and NLG (Natural Language Generation) methods to describe the data sources to users and to generate a machine-interpretable semantic model of the data source. New data sources can be analyzed, for example, to match the data source to a previously-identified user need, and/or as an exploratory approach to develop a broad semantic understanding of the data for subsequent flexible use.

A semantic model of the new dataset can be mapped against the semantic model of the organization's interests to automatically determine an optimal data integration strategy. The data integration strategy can include, for example: description of 1) which data to include in a data catalog; 2) which features to index; 3) which data the customer would like to extract and replicate into a data warehouse landscape of the organization for faster access; and 4) how the data should be organized (e.g., as hot, warm, or cold storage), among others.

After semantic models of organizational needs and data sources are developed and trained, different services can be executed. For example, a service can run that 1) continually monitors user context; 2) searches for relevant data that might be relevant in a given context that a user is authorized to use; and (3) proactively suggest the use of relevant data to enrich results.

As such, the contextualization approach offers various advantages. For example, improvements can be made with respect to serving data to users in a right context, by suggesting to enrich queries and processes with relevant data. As another example, after learning existing user behavior and requirements, new data can be collected and organized according to user importance as indicated by a strength of match between the data and the identified user behavior and requirements. Additionally, based on importance and usage of data, different types of storage can be recommended for different data, based on data importance.

FIG. 1 is a block diagram illustrating an example system 100 for contextualizing data to augment processes using semantic technologies and artificial intelligence. The system 100 includes various system landscape data sources 102, such as various databases 104, cloud storage 106, ERP data 108, and other-system data 110 such as data for HR (Human Resources), finance, manufacturing or other systems. Other types of data sources can be included.

Additionally, different types of user behavior indicators 112 can exist, such as reports 114, queries 116, and process activity 118 from other processes. Other types of user behavior indicators can be used.

A semantics and enrichment service 120 can take as input data from the various system landscape data sources 102 and user behavior indicators 112 and develop a semantic data model 121. The semantic data model 121 can reflect how users are consuming data, including indications of who the users are, which roles the users have, which entities 122 accessed data refers to, which data sources are accessed, which data in the data sources is accessed, connections between data sources and/or connections 124 between entities, how often data is accessed, whether access is seasonal, data ownership information 126 for accessed data. The semantic data model 121 can include other information.

The semantics and enrichment service 120 can use various other services 128 and technologies to develop and train the semantic data model 121, such as unstructured data analysis using NLP 130, ML services 132, tagging 134, and other technologies. The semantic data model 121 can be stored as a stored data model in data storage 136. As described below, information related to the semantic data model 121, including information for accessing data sources, can be stored in a catalog 138. The catalog 138 can include other information such as descriptions of data available in the system that has been built up as an organizational resource, for example.

A queries monitor 140 can monitor user or application context and data access, based on the semantic data model 121. For example, the queries monitor 140 can monitor user access to the catalog 138 and/or monitor queries submitted on behalf of applications 142, such as CRM (Customer Relationship Management) 144, finance 146, HCM (Human Capital Management) 148, manufacturing 150, or other applications. The queries monitor 140 can determine if there is a match between the user context and any data sources annotated in the semantic data model 121, so that a user request can be enriched with additional entities. An enrichment recommendation can be presented, and based on user action or inaction with the recommendation, can become an additional feedback input to user behavior indicators 112. Applications 142 can also become subscribers and be notified via an event bus 152 of updates to the semantic data model 121. For example, the semantics and enrichment service 120 can allow applications 142 to register a user and a given user context to a publish-subscribe system to receive alerts on new relevant data that matches the user context, based on entity or tags.

In further detail, when developing the semantic data model 121, the semantics and enrichment service 120 can identify entities 122 that are being used, how often, by whom, from which systems, how they are being used, and whether on a constant basis or seasonal. For example, the semantics and enrichment service 120 can analyze documents and data in the system landscape data sources 102, the queries 116, process activity 118 (e.g., logs) and other data that is being generated by user activity in the landscape, and information in the catalog 138. In general, input used to build the semantic data model 121 can come in various forms, such as data from structured database tables (e.g., from the databases 104), JSON (JavaScript Object Notation) objects, and structured and/or unstructured files or datasets.

The semantics and enrichment service 120 can use various approaches to create a semantic understanding of analyzed data. As an example, database tables, e.g., from the databases 104, may be partitioned and have cryptic names. Different approaches can be used to determine semantic entities from cryptic technical naming. In some cases, frequently used queries can be used to expand partitioned tables.

As part of identifying semantic entities in the user behavior indicators 112, the semantics and enrichment service 120 can analyze activity information for user use of report tools that can access various data sources by select query statements or back-end code such as stored-procedures. The semantics and enrichment service 120 can collect SELECT query statements and/or stored procedure code and parse and analyze collected statements and code to extract semantic entities used in a particular context. The semantics and enrichment service 120 can also analyze batch processes code that may use similar options or approaches as a reporting engine to access data, to extract additional entities or obtain additional information about previously-extracted entities. The process activity 118 (e.g., logs) can also include information for extracting entities. The catalog 138 can be also used for entity identification since the catalog may already include information that coordinates multiple data sources. The semantics and enrichment service 120 can also identify tags used in the catalog 138 and incorporate the identified tags as tagging information 154 in the semantic data model 121.

Before the semantics and enrichment service 120 develops the semantic data model 121 as a semantic model of the customer's interest, the customer can first determine and configure the semantics and enrichment service with connections to the relevant universe of data to be used for contextualization (e.g., database connections, file locations, API (Application Programming Interface) configuration, etc.). After data connections have been configured, the semantics and enrichment service 120 can, using NLP 130, supervised and unsupervised learning of the ML services 132, and other technologies train AI algorithms to extract and classify entities in the underlying data universe.

The semantic data model 121 can be represented as a knowledge graph of obtained information. For example, the semantics and enrichment service 120 can use entity extraction and classification to map nodes of a knowledge graph. For instance, entity classes can become nodes of the knowledge graph that are annotated with statistical features of the extraction process (e.g., how many extracted entities map to a particular node).

Explicit and implicit foreign key relationships can be used to identify relationships between classes that are annotated with statistical features of relevance (e.g., the number of instances of one class A that have a relationship with instances in class B). Accordingly, the connections 124 between entities can be established to represent relationships in a knowledge graph model of the underlying semantic entities and their relationships. For unstructured data, similar methods can be applied for extracting and classifying entities, but in the absence of foreign keys, a proximity measure between concepts can be used to identify related entities. For instance, whenever two extracted classes frequently appear together, an assumed relationship can be identified and a corresponding edge in the knowledge graph that represents the relationship can have a weight that represents a relationship strength adjusted (e.g., increased).

After constructing a preliminary knowledge graph, such as based on data in the system landscape data sources 102, user behavior indicators 112 can be analyzed to further annotate nodes and edges of the knowledge graph with additional statistical features, such as data access counts and access recency information. In some implementations, the semantics and enrichment service 120 can use a relevance parameter, for example, to filter out weak nodes and edges. The relevance parameter can be set or tuned in several ways. For example, the semantics and enrichment service 120 can use the relevance parameter to control the size of the knowledge graph. The relevance parameter can be determined using statistical methods, e.g., by setting the relevance parameter so that it represents the N most important concepts or so that a resulting knowledge graph obtained after filtering the knowledge graph based on the relevance parameter explains or represents a certain percentage of the data analyzed to create the initial knowledge graph. Higher relevance parameter values can lead to a smaller knowledge graph, which can result in a more focused semantic model that represents the most important concepts of interest to the customer. Having a higher relevance parameter value can translate into a lower TCO (Total Cost of Ownership) for maintaining the system due to lower storage and faster processing. A recency parameter can also be used to give higher preference on more recent data access and thus discount historical data, e.g., by applying exponentially decreasing weights to older data.

After filtering the knowledge graph, the semantics and enrichment service 120 can perform some post processing steps. For example, the semantics and enrichment service 120 can identify isolated subgraphs and clusters in the knowledge graph. Isolated subgraphs can be treated independently as separate graphs with implications on performance (e.g., higher performance for smaller subgraphs) for various algorithms that may be applied to the network topology. Clusters may represent higher-level concepts that can be used as abstractions (e.g., as additional, higher-level entities). Other post-processing can include training an ML model for multi-hop link prediction to account for the fact that an initial knowledge graph may be incomplete. After post-processing is completed, the resulting knowledge graph of the semantic data model 121 represents a model for the customer's predicted semantic interest.

The semantics and enrichment service 120 includes a data discovery component 156 that can be used to process new data sources, e.g., after the semantic data model 121 is initially developed. The data discovery component 156 can perform a discovery process, for example, by being provided with access to one or more new (e.g., previously-unprocessed) data sources, such as files, databases, APIs that connect to available data, etc. As with data used for initial analysis, data in the new data sources may be structured data, such as new data in one of the databases 104, or unstructured data, such free text data in email messages or text extracted from calls collected in a contact center. The data discovery component 156 can process the new data to identify and map relevant data objects to the customer's predicted semantic interests represented in the semantic data model 121.

Processing new data can be performed in a similar manner as for the initial processing of the landscape data sources 102 with the following modifications. If an extracted entity or class is already represented in the knowledge graph of the semantic data model 121, the data discovery component 156 (or another portion of the semantics and enrichments service 120) can mark a corresponding matching node and annotate the node with the data source of the corresponding entity or class. The fact that the entity or class is already represented in the semantic data model 121 can indicate that there is a high level of interest from the customer to learn about additional data related to this concept. As another example, if an extracted entity or class identified in new data is not represented in the semantic data model 121, the entity or class can be added to the knowledge graph as an expanded node. A concept represented in the data source might not be currently directly linked to a customer's area of interest, but can be added to the knowledge graph to capture additional data discovery and can be linked to one or more existing nodes by an edge. Over time, the most important expanded nodes can later play a role in the context of cataloging. After a process of analyzing a new data source has been completed, the data discovery component 156 can have mapped all relevant entities and classes extracted from the data source to nodes in the knowledge graph, annotated the nodes with statistical information, and recorded their relationships to other nodes.

As a next step, the semantics and enrichment service 120 can determine a relevance score for each data source d (e.g., a table or file) that has newly been attached to a node in the underlying knowledge graph. Although determining relevance scores of new data sources is described, the semantics and enrichment service 120 can, in some implementations, determine a relevance score for previously-processed data sources. A relevance score can indicate, for a user whose context is determined by a given context C (e.g., where C is a set of nodes in the knowledge graph) how relevant data from the data source is to the context C. Relevance can be denoted by r(d|C).

To determine a relevance score, the semantics and enrichment service 120 can create an overlay of two subgraphs $G_C$ and $G_d$ induced by the user context and a set of nodes annotated with a given source, respectively. In general, if the intersection between the node sets of V ($G_C$) and V (Ga) is large and a subgraph induced by $G_C$ and $G_d$ is dense and heavily weighted, then the data source can be considered to be highly relevant for the user's context since a relatively large number of entities and classes from the context and the data source match. As another example, if the intersection between the node sets of V($G_C$) and V($G_d$) is empty and the subgraph is very sparse, lowly weighted, or even disconnected, then there is a poor match and the data source can be considered to not be particularly relevant to the user context. The relevance score can be designed as follows. Letting w(e) represent the normalized weight of an edge e, (e.g., where the weights of all edges in the knowledge graph can sum up to 1), then a relevance score can be computed using the formula shown below.

$$r(d|C) = |\sum_{-} \{V(G_C) \cap V(G_d)\} w(v)|^2 + \sum_{e \in E\_Cd} w(e)$$

where $E_{C_d}$ represents the edges of the graph induced by $G_C$ and $G_d$.

In some cases, the calculation of a relevance score using the above formula may consume a larger number of resources (or take a longer time) than is desired, especially considering relevance scores may be computed in real time for new data sources. In some cases, a faster alternative for computing a relevance score can be used. For example, an alternative approach can be used that pre-computes relevance scores for all possible contexts consisting of only one node in the knowledge graph. Using this approach, each node v in the graph that is annotated with a data source d can be annotated with a unique relevance measure representing the relevance of this data source for the concept represented by the node. The relevance measure can be determined by selecting a radius parameter representing a fixed-size sphere around a given node, measured in network hops. A subgraph $G_v$ can be computed that is induced by the radius and the graph nodes annotated with the data source d. A distance can be computed between v and every node u in $G_v$, with the distance denoted as d(u, v). The distance can be used to compute a relevance score as the weighted sum of edge weights, where edge weights are weighted by an additional factor $e^{-d(u,v)}$, where u is the node furthest from v on any edge. Once relevance scores are computed for data sources, the relevance of any context and any data source can easily be computed as the sum of all pre-computed relevance scores over the nodes that represent the user's context C.

In some implementations, the semantics and enrichment service 120 can also assess a relevance of a data source d (e.g., table or file) independent of a user's context, which can be denoted as r(d), e.g., to determine how to generally optimize access to what may be the most relevant data sources. For example, the semantics and enrichment service 120 can compute an expected relevance over all possible contexts using this formula:

$$\mathbb{E}[r(d)] = \sum_{C} p(C) r(d|C)$$

where p(C) denotes the probability of a user working in context C. As another example and for a more-efficient approach, a relevance value can be computed using this formula:

$$\hat{r}(d) = \sum_{c} \hat{p}(c) r(d|c)$$

where c only represents context consisting of a single node and $\hat{p}(c)r(d|c)$ is a normalized value proportional to the number of instances in which c was detected as part of the context in historical user contexts (e.g., as derived from prior analysis of user logs as described above and which may be reconstructed from a node's annotations).

Once relevance scores have been computed for data source(s), the semantics and enrichment service 120 can catalog data sources by relevance score using the catalog 138 to ensure that the most relevant data sources can be efficiently referenced and accessed in correspondence to predicted relevance. For example, the semantics and enrichment service 120 can sort data sources d (e.g., tables, files, etc.) according to their relevance score $\hat{r}(d)$. The semantics and enrichment service 120 can then partition data sources into, for example, four partitions denoted by $D_1, D_2, D_3, D_4$ where partitions $D_1, D_2, D_3$ include the most relevant, medium relevant and least relevant data sources, respectively and partition $D_4$ includes data sources that have been discarded in previous steps due to low relevance. Data source partitions can be computed in multiple ways. For example, an administrator can set parameters that describe an amount or fraction of data to be used for each of the partitions. As another example, the administrator can set limits on storage capacity for each of the partitions. As yet another example, the administrator can set elastic option to expand the storage as needed.

After data source partitions have been established, the following actions can be applied to each data source d depending on further configuration. First, a data catalog entry in the catalog 138 can be generated including structured information about the data source obtained in previous steps, including meta-information computed about popularity, usage and connections to other data sources. The catalog entry can also be summarized using natural language generation. Next, the most relevant attributes of the data source can be indexed for semantic search. Optionally, the most relevant data sources can be replicated in a dedicated data lake for faster access. For instance, data sources in the $D_1$ partition can be replicated to hot storage, data sources in the $D_2$ partition can be replicated to warm storage, and data sources in the $D_3$ partition can be replicated to cold storage, where cold, warm, and hot storage areas offer increasingly faster access, respectively.

Accordingly, data sources can be automatically optimized for fast access to data and storage capacity with a balance of total cost of ownership. Storing data sources in the catalog 138, for example, can enable users to actively search for relevant data sets, for example, by searching the catalog 138 for relevant data sources or searching for specific content. Additionally, the knowledge graph structure of the semantic data model 121 can allow users to navigate data model content using the previously identified semantic relationships.

Additionally and as mentioned, the queries monitor 140 can continually monitor user queries and suggest relevant data sources for a user's context, as described above. Additionally, the applications 142 or other applications can be enabled to serve relevant data sets and insights to users in real time using the semantic data model 121 and the previously-discussed relevance scores. For example, the semantics and enrichment service 120 can provide a SDK (Software Development Kit) to the applications 142 to allow the applications 142 to construct a user's context while using a respective application. The semantics and enrichment service 120 can provide an API that can be used by the applications 142 that can consume the constructed context, analyze the context, and respond to the applications 142 with a prioritized list of relevant data sources that are annotated with information from the catalog 138. The API can also return, for example, data source samples and link(s) to respective data catalog items from the catalog 138.

In further detail, the semantics and enrichment service 120, upon invocation of the API, can analyze the context using similar approaches as described above for constructing the semantic data model and determine most relevant data sources that match the context. The semantics and enrichment service 120 can select relevant data sources based on a relevance parameter that prevents returning results with lower than a specified relevance.

The semantics and enrichment service 120 can also include a feedback loop. For example, upon presenting a data source that has been predicted to be relevant to a user context, the semantics and enrichment service 120 can obtain direct user feedback and collect user data related to usage of or user activity (or lack of) with respect to recommended data sources. User feedback can be incorporated into the user behavior indicators 112 and used as part of ML model training or retraining to improve predictions of relevant data sources for the user.

Figure 2:
FIG. 2 is a diagram that illustrates example structured and unstructured data.

FIG. 2 is a diagram 200 that illustrates example structured and unstructured data. A machines database table 202 stores information for physical machines used for machining. For example, the machines database table 202 can store, for each machine, a machine identifier 204, a model 206, and a description 208. A machines location database table 210 can store information about locations of particular machines. As an example, for each machine for which information is stored, the machine locations database table 210 can store a machine identifier 212, a start date 214, and a location 216. Data in the machines database table 202 can be linked to data in the machine locations database table 210 by matching data in each table based on a machine identifier. A system landscape can also include unstructured data 218 about machines. The unstructured data 218 may be an email message, for example, that describes a maintenance issue for certain machine models. The structured data in the machine database table 202 and the machine locations database table 210, the unstructured data 218, and other types of structured or unstructured data can be represented in a semantic data model, as described below.

Figure 3:
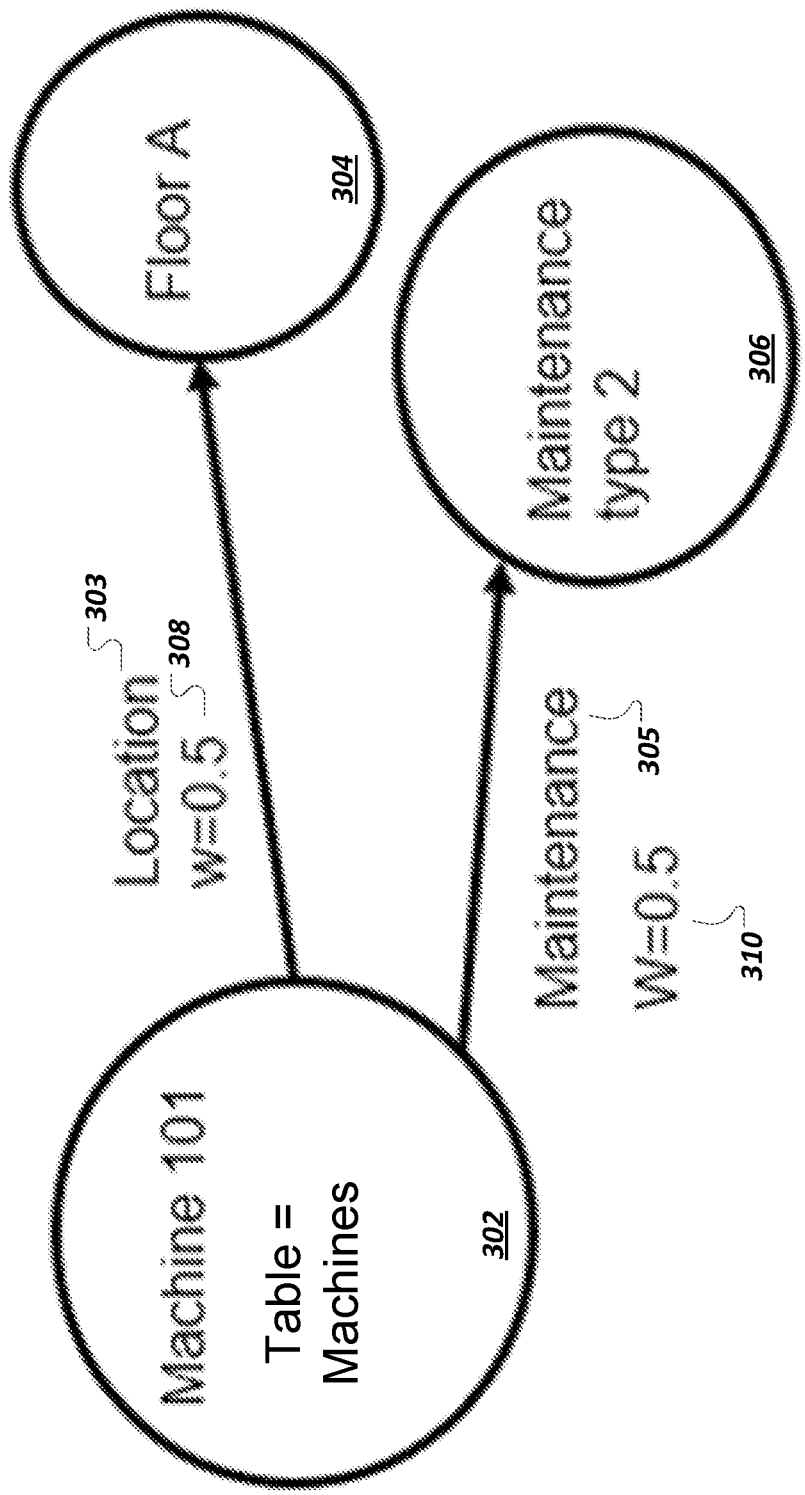
FIG. 3 illustrates an example semantic data model.

FIG. 3 illustrates an example semantic data model 300. The semantic data model 300 can be generated, at least in part, from the structured and unstructured data described above with respect to FIG. 2. For example, the semantic data model 300 includes a machine node 302 that represents an instance of a machine entity (e.g. with machine identifier of "101"). The machine node 302 can include an annotation indicating a data source of the entity (e.g., a machines database table). The machine node 302 is linked, using a location link 303, to a floor node 304 that represents a particular machine location (e.g., floor "A") The machine node 302 is also linked, using a maintenance link 305, to a maintenance node 306 that represents a maintenance issue (e.g., maintenance type 2). Respective links 303 and 305 each have respective weights 308 or 310, respectively. The weights 308 and 310 can each represent a frequency of how often, during generation of the semantic data model 300, connections between connected entities have been identified. The semantic data model 300 can also include weights for respective entities that indicate a strength of user interest based on a count of user activity related to those entities.

Figure 4:
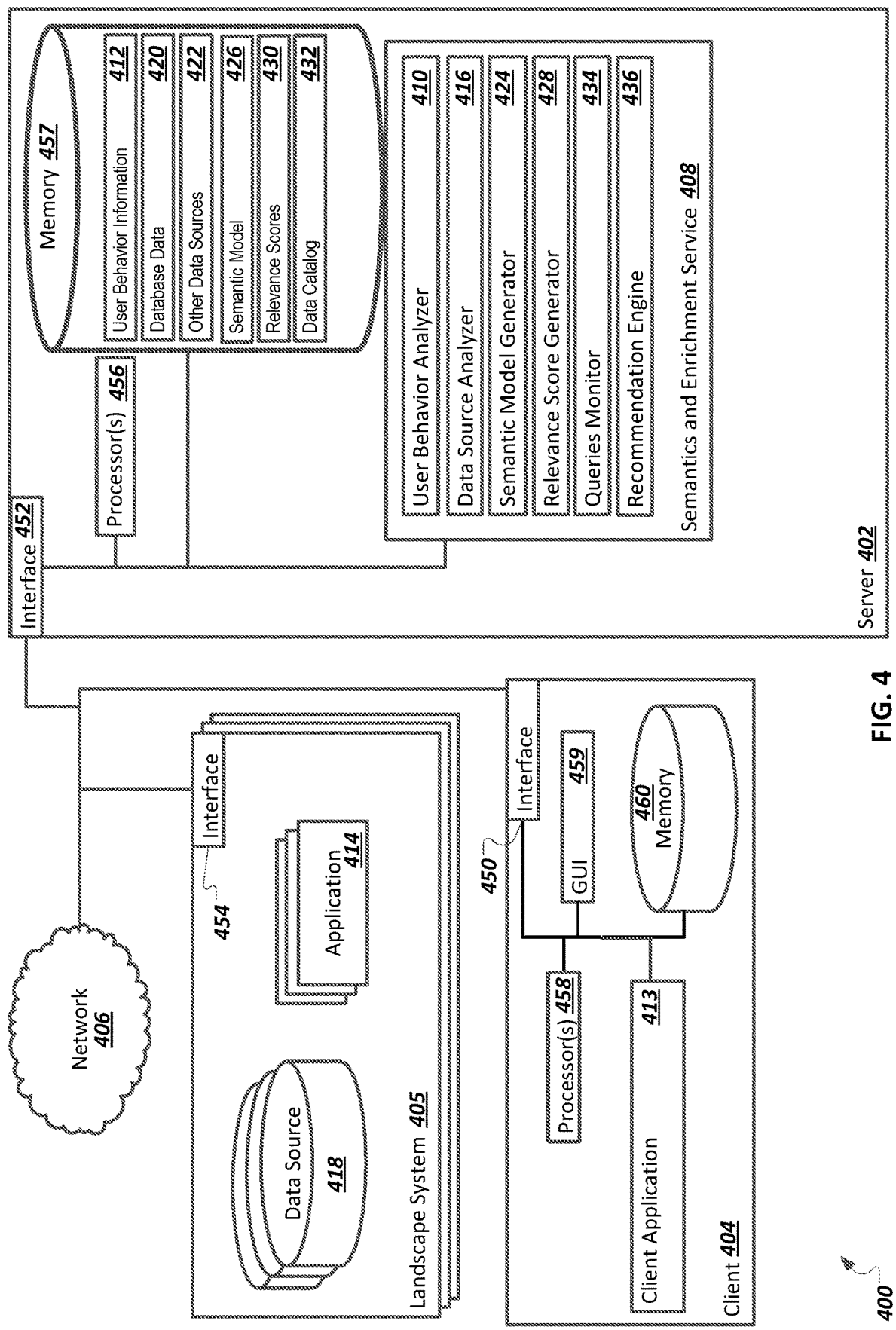
FIG. 4 is a block diagram illustrating an example system for contextualizing data to augment processes using semantic technologies and artificial intelligence.

FIG. 4 is a block diagram illustrating an example system 400 for contextualizing data to augment processes using semantic technologies and artificial intelligence. Specifically, the illustrated system 400 includes or is communicably coupled with a server 402, a client device 404, one or more landscape systems including a landscape system 405, and a network 406. Although shown separately, in some implementations, functionality of two or more systems or servers may be provided by a single system or server. In some implementations, the functionality of one illustrated system or server may be provided by multiple systems or servers.

The system 400 can include a semantics and enrichment service 408 (which can be, for example, the semantics and enrichment service 220 described above with respect to FIG. 2). A user behavior analyzer 410 can analyze user behavior information 412. The user behavior information 412 can include, for example, user activity information from use (e.g., with a client application 413 of the client device 404) of reporting tools, query engines, and/or application use, such as application use of application(s) 414 included in the landscape system 405 or other systems. The user behavior information 412 can also include logs that reflect user activity. A data source analyzer 416 can analyze various types of data sources, including data source(s) 418 included in the landscape system 405 or other systems, database data 420, and other data sources 422 (e.g., other files or other structured or unstructured information, as described above). The user behavior information 412 can indicate user behaviors of users that describe how users consume data in the one or more data sources analyzed by the data source analyzer 416.

A semantic model generator 424 can generate, using a knowledge graph, a semantic model 426 for the analyzed data sources and user behaviors. Nodes of the knowledge graph included in the semantic model 426 can correspond to a class of entities in the analyzed data sources. Nodes can be annotated with user behaviors and data source information, for example.

A user behavior of use a data source can be referred to as a user context. A relevance score generator 428 can generate relevance scores 430 for user contexts. A relevance score for a data source for a respective user context can indicate a strength of match of the data source to the user context, for example. The semantics and enrichment service 408 can add catalog entries to a data catalog 432 for data sources that have highest relevance scores for user contexts, for example. In some implementations, a user can use the client application 413 (or another application) to query the data catalog 432 to discover data sources relevant to a user context. However, users may not be aware of, or may think to query the data catalog 432.

Alternatively, relevant data sources can be surfaced to users in real time. For example, a queries monitor 434 can monitor queries submitted by a user, e.g., as part of a query tool, a reporting tool, or queries otherwise submitted on behalf of the client application 413 or from user use of applications 414 in the landscape system 405 or other systems. In response to identifying a current query, a recommendation engine 436 can recommend, based on the semantic model 426, the user, and the current query, one or more relevant data sources that may be relevant to the current user context. For example, the recommendation engine 436 can identify one or more data sources that have highest relevance scores to a user context that the current query. The semantic model 426 can be updated based on whether the user interacts with the recommended data source(s).

As used in the present disclosure, the term "computer" is intended to encompass any suitable processing device. For example, although FIG. 4 illustrates a single server 402 and a single client device 404, the system 400 can be implemented using a single, stand-alone computing device, two or more servers 402, or two or more client devices 404. Indeed, the server 402, the landscape system 405, and the client device 404 may be or include any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 402 and the client device 404 may be adapted to execute any operating system, including Linux, UNIX, Windows, Mac OS®, Java™M, Android™M, iOS or any other suitable operating system. According to one implementation, the server 402 may also include or be communicably coupled with an e-mail server, a Web server, a caching server, a streaming data server, and/or other suitable server.

Interfaces 450, 452, and 454 can be used by the client device 404, the server 402, and the landscape system 405, respectively, for communicating with other systems in a distributed environment—including within the system 400—connected to the network 406. Generally, the interfaces 450, 452, and 454 each comprise logic encoded in software and/or hardware in a suitable combination and operable to communicate with the network 406. More specifically, the interfaces 450, 452, and 454 may each comprise software supporting one or more communication protocols associated with communications such that the network 406 or interface's hardware is operable to communicate physical signals within and outside of the illustrated system 400.

The server 402 includes one or more processors 456. Each processor 456 may be a central processing unit (CPU), a blade, an application specific integrated circuit (ASIC), a field-programmable gate array (FPGA), or another suitable component. Generally, each processor 456 executes instructions and manipulates data to perform the operations of the server 402. For example, each processor 456 executes the functionality required to receive and respond to requests from the client device 404, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™M, JavaScript®, Visual Basic, assembler, Perl®, any suitable version of 4GL, as well as others. While portions of the software illustrated in FIG. 4 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 402 includes memory 457. In some implementations, the server 402 includes multiple memories. The memory 457 may include any type of memory or database module and may take the form of volatile and/or non-volatile memory including, without limitation, magnetic media, optical media, random access memory (RAM), read-only memory (ROM), removable media, or any other suitable local or remote memory component. The memory 457 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 402.

The client device 404 may generally be any computing device operable to connect to or communicate with the server 402 via the network 406 using a wireline or wireless connection. In general, the client device 404 comprises an electronic computer device operable to receive, transmit, process, and store any appropriate data associated with the system 400 of FIG. 4. The client device 404 can include one or more client applications, including the client application 413. A client application is any type of application that allows the client device 404 to request and view content on the client device 404. In some implementations, a client application can use parameters, metadata, and other information received at launch to access a particular set of data from the server 402. In some instances, a client application may be an agent or client-side version of the one or more enterprise applications running on an enterprise server (not shown).

The client device 404 further includes one or more processors 458. Each processor 458 included in the client device 404 may be a central processing unit (CPU), an application specific integrated circuit (ASIC), a field-programmable gate array (FPGA), or another suitable component. Generally, each processor 458 included in the client device 404 executes instructions and manipulates data to perform the operations of the client device 404. Specifically, each processor 458 included in the client device 404 executes the functionality required to send requests to the server 402 and to receive and process responses from the server 402.

The client device 404 is generally intended to encompass any client computing device such as a laptop/notebook computer, wireless data port, smart phone, personal data assistant (PDA), tablet computing device, one or more processors within these devices, or any other suitable processing device. For example, the client device 404 may comprise a computer that includes an input device, such as a keypad, touch screen, or other device that can accept user information, and an output device that conveys information associated with the operation of the server 402, or the client device 404 itself, including digital data, visual information, or a GUI 459.

The GUI 459 of the client device 404 interfaces with at least a portion of the system 400 for any suitable purpose, including generating a visual representation of the client application 413. In particular, the GUI 459 may be used to view various Web pages or other user interfaces. Generally, the GUI 459 provides the user with an efficient and user-friendly presentation of business data provided by or communicated within the system. The GUI 459 may comprise a plurality of customizable frames or views having interactive fields, pull-down lists, and buttons operated by the user. The GUI 459 contemplates any suitable graphical user interface, such as a combination of a generic web browser, intelligent engine, and command line interface (CLI) that processes information and efficiently presents the results to the user visually.

Memory 460 included in the client device 404 may include any memory or database module and may take the form of volatile or non-volatile memory including, without limitation, magnetic media, optical media, random access memory (RAM), read-only memory (ROM), removable media, or any other suitable local or remote memory component. The memory 460 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 404.

There may be any number of client devices 404 associated with, or external to, the system 400. For example, while the illustrated system 400 includes one client device 404, alternative implementations of the system 400 may include multiple client devices 404 communicably coupled to the server 402 and/or the network 406, or any other number suitable to the purposes of the system 400. Additionally, there may also be one or more additional client devices 404 external to the illustrated portion of system 400 that are capable of interacting with the system 400 via the network 406. Further, the term "client", "client device" and "user" may be used interchangeably as appropriate without departing from the scope of this disclosure. Moreover, while the client device 404 is described in terms of being used by a single user, this disclosure contemplates that many users may use one computer, or that one user may use multiple computers.

Figure 5:
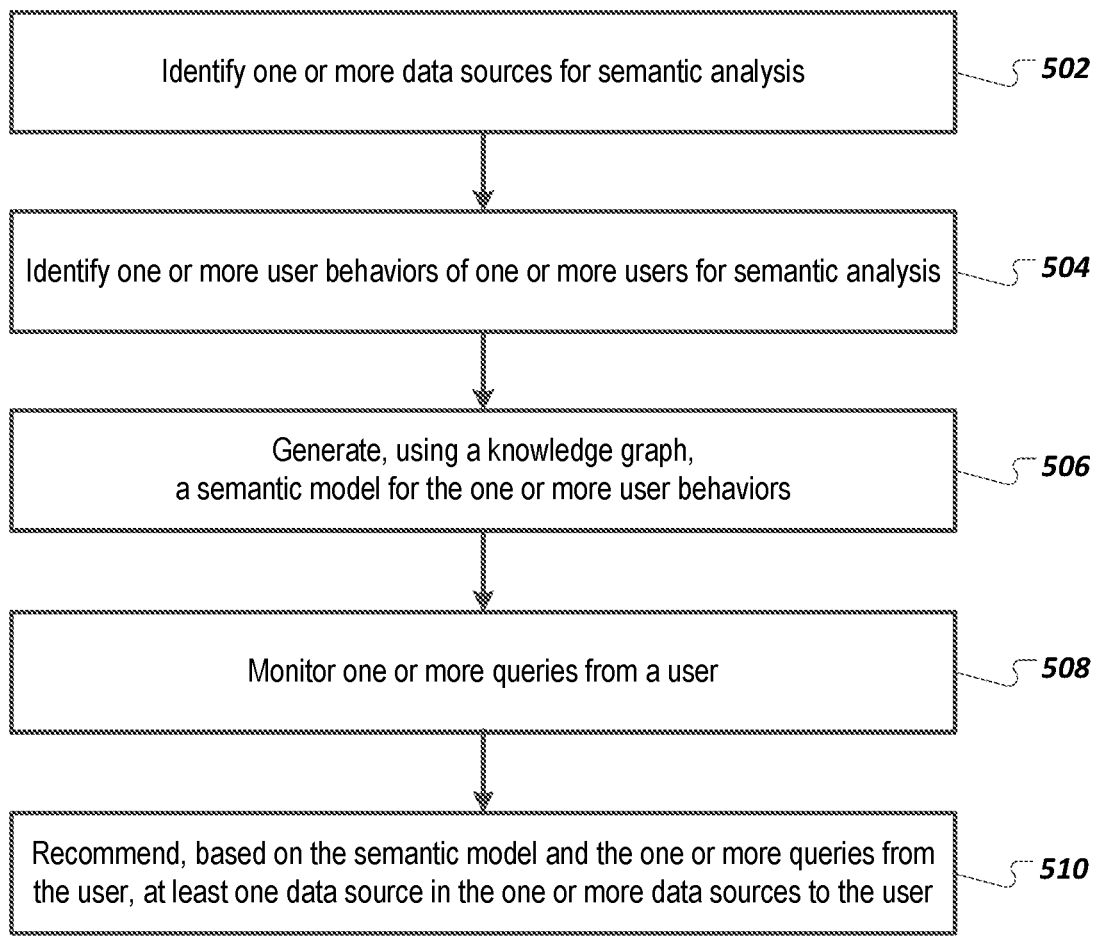
FIG. 5 is a flowchart of an example method for contextualizing data to augment processes using semantic technologies and artificial intelligence.

FIG. 5 is a flowchart of an example method for contextualizing data to augment processes using semantic technologies and artificial intelligence. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1 and/or the system 400 described above with respect to FIG. 4. For example, the method 500 and related methods can be executed by the semantics and enrichment service 120 of FIG. 1.

At 502, one or more data sources are identified for semantic analysis. The one or more data sources can include at least one of a data warehouse, a database, or a data lake. The data sources can include structured and/or unstructured data.

At 504, one or more user behaviors of one or more users are identified for semantic analysis. The one or more user behaviors include behaviors of how the one or more users consume data in the one or more data sources. User behaviors can include, for example, a user report request, a user query, or logged information indicating user activity with one or more processes. A user behavior using a data source can be referred to a user context.

At 506, a semantic model is generated, using a knowledge graph, for the one or more user behaviors. Nodes of the knowledge graph correspond to a class of entities in the one or more data sources and are annotated with user behaviors and data source information. The semantic model can be developed using one or more of natural language processing and machine learning. Relevance scores can be computed for data sources for user contexts. A respective relevance score for a data source for a respective user context can indicate a strength of match of the data source to the user context. Data sources with highest relevance scores can be added to a data catalog.

At 508, one or more queries from a user are monitored.

At 510, at least one data source is recommended to the user based on the semantic model and the one or more queries from the user. Recommending at least one data source to the user can include identifying one or more data sources that have highest relevance scores to a user context that matches the one or more queries of the user. A determination can be made as to whether the user interacted with a recommended data source. The semantic model can be updated based on whether the user interacted with the recommended data source.

As another example, a catalog search request can be received from a user for data in the data catalog that matches a user context. Data sources in the data catalog can be identified that match the user context. Catalog entries for data sources that match the user context of the search request can be provided in response to the catalog search request.

In some instances, after the semantic model is generated, a new data source can be identified. Semantic analysis can be performed on the new data source, and the semantic model can be updated based on the semantic analysis of the new data source. Relevance scores can be determined for the new data source for user contexts in the semantic model. The new data source may be recommended as a match to a user context associated with a future query.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, comprising:
   identifying one or more data sources for semantic analysis, wherein the one or more data sources comprise at least one of a data warehouse, a database, or a data lake;
   identifying one or more user behaviors of one or more users for semantic analysis, wherein the one or more user behaviors comprise behaviors of how the one or more users consume data in the one or more data sources;
   generating, using a knowledge graph, a semantic model for the one or more user behaviors, wherein nodes of the knowledge graph correspond to a class of entities in the one or more data sources and are annotated with user behaviors and data source information;
   monitoring one or more queries from a user; and
   recommending, based on the semantic model and the one or more queries from the user, data from at least one node of the knowledge graph to the user.

2. The computer-implemented method of claim 1, wherein user behaviors comprise a user report request, a user query, or logged information indicating user activity with one or more processes.

3. The computer-implemented method of claim 1, wherein a user behavior using a data source comprises a user context.

4. The computer-implemented method of claim 3, further comprising computing relevance scores for data sources for user contexts, wherein a respective relevance score for a data source for a respective user context indicate a strength of match of the data source to the user context.

5. The computer-implemented method of claim 4, wherein recommending data from at least one knowledge graph node to the user comprises identifying one or more nodes that are associated with data sources have highest relevance scores to a user context that matches the one or more queries of the user.

6. The computer-implemented method of claim 4, further comprising adding data sources with highest relevance scores to a data catalog.

7. The computer-implemented method of claim 6, further comprising:
   receiving a search request from a user for data in the data catalog that matches a user context;
   identifying catalog entries in the data catalog that match the user context; and
   providing, in response to the search request, the identified catalog entries that match the user context of the search request.

8. The computer-implemented method of claim 1, wherein the one or more data sources include structured and unstructured data.

9. The computer-implemented method of claim 1, wherein the semantic model is developed using one or more of natural language processing and machine learning.

10. The computer-implemented method of claim 1, further comprising:
    determining whether the user interacted with recommended data; and
    updating the semantic model based on whether the user interacted with recommended data.

11. The computer-implemented method of claim 1, further comprising:
    identifying a new data source;
    performing semantic analysis on the new data source; and
    updating the semantic model based on the semantic analysis of the new data source including adding or updating nodes in the knowledge graph to include data from the new data source.

12. The computer-implemented method of claim 11, further comprising determining relevance scores for added and updated nodes for user contexts in the semantic model.

13. The computer-implemented method of claim 12, further comprising recommending knowledge graph data that includes data from the new data source as a match to a user context of a new user query.

14. The computer-implemented method of claim 1, wherein recommending data from at least one node of the knowledge graph to the user comprises recommending, to the user, a data source associated with a first node.

15. A system comprising:
    one or more computers; and
    a computer-readable medium coupled to the one or more computers having instructions stored thereon which, when executed by the one or more computers, cause the one or more computers to perform operations comprising:
- identifying one or more data sources for semantic analysis, wherein the one or more data sources comprise at least one of a data warehouse, a database, or a data lake;
- identifying one or more user behaviors of one or more users for semantic analysis, wherein the one or more user behaviors comprise behaviors of how the one or more users consume data in the one or more data sources;
- generating, using a knowledge graph, a semantic model for the one or more user behaviors, wherein nodes of the knowledge graph correspond to a class of entities in the one or more data sources and are annotated with user behaviors and data source information;
- monitoring one or more queries from a user; and
- recommending, based on the semantic model and the one or more queries from the user, data from at least one node of the knowledge graph to the user.

16. The system of claim 15, wherein user behaviors comprise a user report request, a user query, or logged information indicating user activity with one or more processes.

17. The system of claim 15, wherein the operations further comprise computing relevance scores for data sources for user contexts, wherein a respective relevance score for a data source for a respective user context indicate a strength of match of the data source to the user context.

18. A non-transitory, computer-readable medium coupled to one or more processors and having instructions stored thereon which, when executed by the one or more processors, cause the one or more processors to perform operations, the operations comprising:
- identifying one or more data sources for semantic analysis, wherein the one or more data sources comprise at least one of a data warehouse, a database, or a data lake;
- identifying one or more user behaviors of one or more users for semantic analysis, wherein the one or more user behaviors comprise behaviors of how the one or more users consume data in the one or more data sources;
- generating, using a knowledge graph, a semantic model for the one or more user behaviors, wherein nodes of the knowledge graph correspond to a class of entities in the one or more data sources and are annotated with user behaviors and data source information;
- monitoring one or more queries from a user; and
- recommending, based on the semantic model and the one or more queries from the user, data from at least one node of the knowledge graph to the user.

19. The computer-readable medium of claim 18, wherein user behaviors comprise a user report request, a user query, or logged information indicating user activity with one or more processes.

20. The computer-readable medium of claim 18, wherein the operations further comprise computing relevance scores for data sources for user contexts, wherein a respective relevance score for a data source for a respective user context indicate a strength of match of the data source to the user context.

* * * * *